3,018,222
CENTRAL STIMULANT AND APPETITE DEPRESSANT COMPOSITION

Harm Siemer, Konstanz, and Otto Hengen, Wehr, Baden, Germany, assignors to Ravensberg G.m.b.H., Chemische Fabrik, Konstanz, Germany, a corporation of Germany
No Drawing. Filed Aug. 28, 1956, Ser. No. 606,547
11 Claims. (Cl. 167—67)

The present invention relates to a new and valuable central stimulating and appetite depressant composition and more particularly to a composition having as one of its active ingredients an ester of an acid of the phenyl acetic acid series with tetrahydro-1,4-oxazine-N-ethanol compounds.

Such esters are described in detail in copending application Serial No. 554,389 of Harm Siemer, one of the present joint inventors, Fritz Kurzen, and Adolf Doppstadt which application is entitled "New Esters of Phenyl Acetic Acids and a Process of Making Same," and was filed December 21, 1955, now Patent No. 2,868,786.

It is one object of the present invention to provide a new and valuable pharmaceutical composition of remarkably low toxicity which has a considerable stimulating effect on the central nervous system but does not adversely affect heart function and blood circulation and which is useful as central stimulant and appetite depressant.

Another object of the present invention is to provide new and valuable readily water soluble salts or addition compounds of theophylline or 8-halogeno theophylline and especially of 8-chloro theophylline with specific substituted 1-oxa-4-aza cycloalkane compounds.

Other objects of the present invention and advantageous features thereof will become apparent as the description proceeds.

As stated above the new and valuable pharmaceutical compositions have as the one physiologically active ingredient esters of acids of the phenyl acetic acid series. Such new esters and their acid addition salts are derived from phenyl acetic acids of the following Formula I:

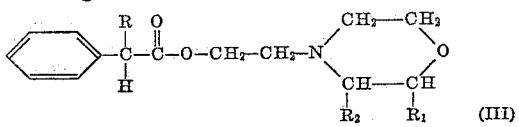

In said formula R indicates hydrogen, an alkyl radical and more particularly an alkyl radical with 1 to 5 carbon atoms, an aryl radical which may also be substituted, and more particularly a mononuclear aryl radical such as the phenyl, tolyl, or xylyl radical, an aralkyl radical and more particularly a mononuclear aryl (lower) alkyl radical such as the benzyl radical, a pyridyl radical or a piperidyl radical whereby in such heterocyclic radicals the nitrogen atom may be positioned in any desired position with respect to the α-carbon atom of the phenyl acetic acid, and more particularly a piperidyl radical attached in 2-position to the α-carbon atom of phenyl acetic acid.

The alcohol component of the new esters according to the present invention is derived from tetrahydro-1,4-oxazine-N-ethanol compounds of the following Formula II:

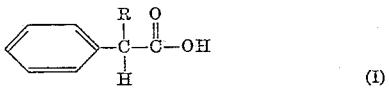

In said formula $R_1$ indicates hydrogen, an alkyl radical and more particularly an alkyl radical with 1 to 5 carbon atoms, or an aryl radical which may also be substituted, and more particularly a phenyl radical, and $R_2$ indicates hydrogen or an alkyl radical and more particularly an alkyl radical with 1 to 5 carbon atoms.

The resulting new esters of Formula III:

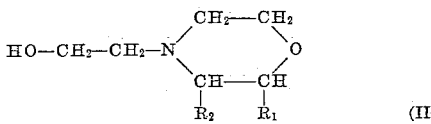

in which formula R, $R_1$, and $R_2$ indicate the same substituents as given above, are obtained by esterifying a phenyl acetic acid of Formula I with a tetrahydro-1,4-oxazine-N-ethanol of Formula II. For instance, the acid halogenides and more particularly the acid chlorides of phenyl acetic acids of Formula I, such as α-phenyl-α-ethyl acetic acid chloride, are reacted with tetrahydro-1,4-oxazine-N-ethanol compounds of Formula II, for instance, with 2-phenyl-3-methyl-4-(β-hydroxy ethyl) tetrahydro-1,4-oxazine, advantageously in a suitable solvent, such as anhydrous toluene, and preferably at elevated temperature, and converting the resulting ester hydrohalogenides into the corresponding bases. The yield is between about 90% and about 95%. When using, for instance, the above mentioned reactants, α-phenyl-α-ethyl acetic acid-(2-phenyl-3-methyl tetrahydro-1,4-oxazine)-N-ethyl ester is obtained in an excellent yield.

According to another embodiment of the present invention there can also be used as the one reaction component, in place of the acid halogenides of phenyl acetic acids of Formula I, esters of said acids with lower alcohols, for instance, α-phenyl-α-ethyl acetic acid methyl ester. Reaction of such esters with tetrahydro-1,4-oxazine compounds according to Formula II in the presence of a suitable catalyst such as sodium methylate, yields the free ester bases of Formula III.

The new esters represent valuable compounds which are useful for many purposes. They have, for instance, a satisfactory insect repellent and especially mosquito repellent property. They are effective preserving agents, for instance, in lacquer coatings and the like. They have interesting physiological properties and possess, for instance, an antidepressive and stimulating activity which is similar but superior to that of caffeine. They have also a marked appetite depressing activity.

The following examples serve to illustrate the preparation of such new esters of the phenyl acetic acid series without, however, being limited thereto.

EXAMPLE 1

1105 g. of 2-phenyl-3-methyl-4-(β-hydroxy ethyl) tetrahydro-1,4-oxazine are dissolved in 4000 cc. of anhydrous toluene. 910 g. of α-phenyl-α-ethyl acetic acid chloride are dissolved in 400 cc. of anhydrous toluene and the resulting solution is slowly added to the heated solution of the tetrahydro-1,4-oxazine compound. The mixture is then heated to boiling for about 5 hours. About 1000 g. of ice are added to the cooled reaction mixture which is then rendered alkaline by the addition of 20% sodium carbonate solution to a pH of 9.0. Thereafter the mixture is vigorously stirred by means of a turbine mixer for one hour and the toluene phase is separated. The toluene solution is washed with 1000 cc. of saturated sodium chloride solution and is dried over anhydrous sodium sulfate. The toluene is then evaporated and the residue is subjected to high vacuum distillation. 1650 g. of α-phenyl-α-ethyl acetic acid-(2-phenyl-3-methyl tetrahydro-1,4-oxazine)-N-ethyl ester, boiling at 235–240° C./0.05 mm. are obtained thereby in a yield of 90.5% of the theoretical yield.

The hydrochloride of said basic ester is prepared by dissolving the ester in ether and passing anhydrous hydrochloric acid into the ethereal solution. Its melting point is 148–150° C.

EXAMPLE 2

63.6 g. of 2-phenyl-3-methyl-4-(β-hydroxy ethyl) tetrahydro-1,4-oxazine and 38.4 g. of α-phenyl-α-ethyl acetic acid methyl ester are heated to boiling for 6 hours, while stirring, in 45 cc. of anhydrous methanol to which 10 cc. of a sodium methylate solution in methanol containing 0.65 g. of sodium metal are added. Thereafter, methanol is distilled off while continuing stirring and heating to a temperature of 250° C. and the remaining reaction mixture is heated at 250° C. for 6 more hours while stirring. Ice water is added to the cooled reaction product, the mixture is rendered alkaline by the addition of potassium carbonate, and is extracted with ether. The ethereal solution is washed with saturated sodium chloride solution until it is of neutral reaction, and is dried over anhydrous sodium sulfate. The ether is then evaporated and the residue is distilled in a vacuum. 76 g. of α-phenyl-α-ethyl acetic acid-(2-phenyl-3-methyl tetrahydro-1,4-oxazine)-N-ethyl ester of the boiling point 232–238° C./0.05 mm. are obtained thereby.

Said ester base is converted into its hydrochloride in the same manner as described hereinabove in Example 1.

In place of α-phenyl-α-ethyl acetic acid chloride used in Example 1 or of the corresponding methyl ester used in Example 2 as the one reaction component, there can be employed equimolecular amounts of other phenyl acetic acid halogenide or ester compounds while otherwise the procedure is the same as described in said Example 1. Such halogenides or esters are, for instance, the halogenides or esters of the following acids:

α-Phenyl acetic acid,
Hydratropic acid (2-phenyl propionic acid),
2-phenyl pentanoic acid,
α,α-Bis (phenyl) acetic acid,
α-Phenyl-α-(o-tolyl) acetic acid,
α-Phenyl-α-(2,6-xylyl) acetic acid,
2,3-bis (Phenyl) propionic acid (α-phenyl-α-benzyl acetic acid),
α-Phenyl-2-piperidino acetic acid, and others.

In place of 2-phenyl-3-methyl-4-(β-hydroxy ethyl) tetrahydro-1,4-oxazine used in the preceding examples as starting material, there can be employed other tetrahydro-1,4-oxazine compounds of Formula II while otherwise the procedure is the same as in said examples. Such oxazine compounds are, for instance, 4-morpholine ethanol (tetrahydro-1,4-oxazine-N-ethanol),
2-phenyl-4-(β-hydroxy ethyl) tetrahydro-1,4-oxazine,
2-methyl-3-methyl-4-(β-hydroxy ethyl) tetrahydro-1,4-oxazine, and others.

The 2-phenyl-3-methyl-4-(β-hydroxy ethyl) tetrahydro-1,4-oxazine and other 4-(hydroxy alkyl)tetrahydro-1,4-oxazine compounds used as alcoholic reaction components for the esterification reaction are readily obtained by the addition of ethylene oxide or other alkylene oxides to 2-phenyl-3-methyl morpholine or other tetrahydro-1,4-oxazine compounds preferably in methanolic solution. Such compounds can also be obtained by reacting the corresponding morpholine compounds with ethylene chlorohydrin or other alkylene chlorohydrins.

In place of the hydrochloride there can be produced other acid addition salts of the new ester bases, such as the hydrobromides, sulfates, phosphates, nitrates as well as acid addition salts with organic acids, such as salts with acetic acid, propionic acid, malonic acid, maleic acid, citric acid, succinic acid, malic acid, tartaric acid, benzoic acid, salicyclic acid, nicotinic acid, isonicotinic acid, and others.

An especially valuable compound according to the present invention is the α-phenyl-α-ethyl acetic acid ester of 2-phenyl-3-methyl-4-(β-hydroxy ethyl) tetrahydro-1,4-oxazine of Examples 1 and 2. Said compound has a rather high central stimulating effect. At the same time, it arrests or retards the laying on of fat. It has, however, a negatively inotropic effect on the heart muscle, i.e. it weakens the force of the heart muscle. Thus, it has a certain undesired effect upon blood circulation.

According to an especially valuable embodiment of the present invention a composition is provided which contains as active ingredient said 2-phenyl-3-methyl-4-(β-hydroxy ethyl)tetrahydro-1,4-oxazine ester of α-phenyl-α-ethyl acetic acid and which is free of such negatively inotropic action on heart and blood circulation. Such a composition is characterized by containing water soluble salts of 1-oxa-4-aza cycloalkane compounds having 6 to 8 atoms in their nucleus which are substituted in 2- and 3-positions and, if required, also in 4-position. Such 1-oxa-4-aza cycloalkane compounds correspond to the following Formula IV

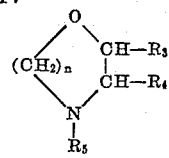

(IV)

wherein $R_3$ represents an aryl radical which may be substituted, for instance, by hydroxyl groups or by chlorine, and preferably a phenyl radical;

$R_4$ represents an alkyl radical, preferably a lower alkyl radical;

$R_5$ represents hydrogen, an alkyl radical, or a hydroxy alkyl radical, preferably a lower alkyl radical or a hydroxy (lower) alkyl radical; and $n$ indicates an integer from 2 to 4.

The water insoluble 1-oxa-4-aza cycloalkane compounds according to the above given Formula IV can readily be converted into readily water soluble salts with 1,3-dimethyl xanthine (theophylline) or its halogenated derivative 8-halogeno-1,3-dimethyl xanthine (8-halogeno theophylline) and preferably with 8-chloro-1,3-dimethyl xanthine. Such salts are more water soluble than the corresponding hydrochlorides. Conversion of 1-oxa-4-aza cycloalkane compounds of Formula IV into their water soluble salts with theophylline or 8-halogeno theophylline has the further advantage that the valuable therapeutic properties of said 1-oxa-4-aza cycloalkane compounds are considerably enhanced.

It was found that, when preparing compositions containing the α-phenyl-α-ethyl acetic acid ester of 2-phenyl-3-methyl-4-(β-hydroxy ethyl) tetrahydro-1,4-oxazine and the salts, i.e. addition compounds of theophylline or 8-halogeno theophylline to 1-oxa-4-aza cycloalkane compounds of Formula IV, the preferred ratio of said two components is a ratio of ester to addition compound between about 3:7 and about 7:3 and preferably a ratio of 2:3.

Especially favorable results are achieved by preparing compositions which contain the α-phenyl-α-ethyl acetic acid ester of 2 - phenyl - 3 - methyl - 4 - (β-hydroxy ethyl) tetrahydro-1,4-oxazine and the theophylline or 8-chloro theophylline addition compounds of the dextrorotatory forms of 1-oxa-4-aza cycloalkane compounds of Formula IV in the above given ratio.

The preferred water soluble salts of 1-oxa-4-aza cycloalkane compounds of Formula IV used for this purpose are the 8-chloro theophylline salts of 2-phenyl-3-methyl-4-methyl morpholine;
2-phenyl-3methyl morpholine;
2-phenyl-3-methyl-4-(β-hydroxy ethyl) morpholine; and
2-phenyl-3-methyl-1-oxa-4-aza cycloheptane.

Compositions containing the α-phenyl-α-ethyl acetic acid ester of 2-phenyl-3-methyl-4-(β-hydroxy ethyl) tetrahydro-1,4-oxazine and said theophylline or 8-halogeno theophylline addition compounds or salts of 1-oxa-4-aza cycloalkane compounds of Formula IV do not exhibit the negatively inotropic activity of said phenyl ethyl acetic acid esters. In such compositions, their negatively inotropic activity is compensated for by the addition of the theophylline or 8-halogeno theophylline salts and no harmful effect upon blood circulation is observed. Such compositions, furthermore, are the least toxic of the psychoanaleptic agents in use which have simultaneously an appetite-depressing action and which are well tolerated. Pharmacological and clinical investigations indicate that the central stimulating action of the new compositions is quite similar to that of caffeine. Their place in the drug arsenal of the medical art is between caffeine and the more highly effective central stimulants. They are capable of allaying the sensation of hunger especially in persons in whom a predisposition to obesity is evident, and, therefore, can successfully be used for the treatment of obesity. Excellent results are also achieved in alleviating fatigue or weakness, certain hypotonic conditions, mental depressive states, lack of concentration, slight psychic inhibitions, retarded convalescence, sea- and airsickness, and the like conditions.

The following example illustrates the preparation of a composition which has proved of special value in clinical use. It is, however, understood that the present invention is not limited to said example.

EXAMPLE 3

20 g. of the hydrochloride of the α-phenyl-α-ethyl acetic acid ester of 2-phenyl-3-methyl-4-(β-hydroxy ethyl) tetrahydro-1,4-oxazine and 30 g. of the 8-chloro theophylline salt of 2-phenyl-3-methyl tetrahydro-1,4-oxazine are intimately mixed with 45 g. of lactose and the mixture is granulated. 4.5 g. of talc and 0.5 g. of stearic acid are added to said granulated mixture and the resulting mass is tableted yielding about 1000 tablets each containing about 20 mg. of the hydrochloride of the α-phenyl-α-ethyl acetic acid ester of 2-phenyl-3-methyl-4-(β-hydroxy ethyl) tetrahydro-1,4-oxazine and 30 mg. of the 8-chloro theophylline salt of 2-phenyl-3-methyl tetrahydro-1,4-oxazine.

One to two tablets containing 50 mg. to 100 mg. of the mixture of active ingredients given orally produces a mild and well compensated psycho-analeptic effect without the occurrence of flight of ideas or similar symptoms. Said central stimulating effect sets in within about 20 minutes to 30 minutes. Its maximum is attained within about 1 hour to 2 hours. Even after 3 hours to 4 hours the effect is still detectable and then slowly ceases. The action of caffeine is considerably surpassed. The action of highly effective central stimulants similar to the arousal amines, however, is not attained.

Hypotonic systolic blood pressure values are increased within a few hours by administration of 100 mg. or more. In many instances the blood pressure is increased to normal values according to the age of the person. No increase in blood pressure above normal values is observed even in prolonged administration. At the same time dizziness and other complaints due to hypotension disappear. The electro-cardiogram does not show any anomalies. Pulse-frequency is not changed by doses up to 300 mg. No unfavorable effect upon heart function is observed.

Oral administration of 100 mg. to 200 mg. of the above described composition has a diminishing effect upon fat accumulation by the body in constitutional or cerebrally induced obesity. The body weight is decreased by 1.0 kg. to 2.0 kg. and, as a maximum, by 6.0 kg. within 10 days to 14 days. This reduction in weight is apparently due to reduced food intake. The new composition assists the individual in adhering to a strict dietary regimen. Lower doses than 100 mg. often have an appetite diminishing effect. No undesirable side-effects nor aversion to food is observed.

Compositions according to Example 3 in which the 8-chloro theophylline salt of 2-phenyl-3-methyl tetrahydro-1,4-oxazine is replaced by 8-chloro theophylline or theophylline salts of other 2-phenyl-3-alkyl substituted 1-oxa-4-aza cycloalkane compounds, have about the same physiological effect as the composition described in said Example 3.

While the composition described in detail in Example 3 is the preferred and therapeutically most suitable composition, it is, of course, understood that such other compositions which have similar physiological activity can be prepared in an analogous manner by replacing the 8-chloro theophylline salt of 2-phenyl-3-methyl-1,4-morpholine by other theophylline or 8-halogeno theophylline salts of 1-oxa-4-aza cycloalkane compounds of Formula IV or by salts of other acids. For instance in Example 3 instead of 30 mg. chlorotheophylline compound there may be taken 20 mg. of the sulphate salt.

In place of tablets, as they are described in the above given Example 3, the new composition may also be administered in the form of pills, powders, capsules, solutions, emulsions, suspensions, dispersions and in any other suitable form.

In the case of powders a fine uniform dispersion of the active ingredients throughout the powder is of importance. Such a fine dispersion can be achieved by intimately mixing and milling both components, for instance, in a ball mill with a solid, pulverulent extending agent to the desired degree of fineness or by impregnating the already milled, finely powdered, solid carrier with a mixture of the active ingredients in water or another suitable solvent and then removing water or solvent.

A fine dispersion of the compounds can also be brought about by emulsifying the same with the aid of a dispersing or emulsifying agent.

When preparing tablets, pills, powders, and the like shaped preparations to be used in human therapy, the commonly used diluting agents, binders, lubricants, and the like are employed, such as sugar, lactose, starch, bolus alba; as binders gelatine, gum arabic, methyl cellulose, pectin, yeast extract, agar, tragacanth; and as lubricants talc, stearic acid, magnesium stearate, and others.

The content of active components in such preparations may vary. It is, of course, recommended that the active compound is present in said preparations in such an amount that a suitable dosage will be ensured. Ordinarily the preparations should not contain less than 25% of the active ingredients. The preferred amounts to be employed are between 30% and 80% of the preparation. To use greater amounts is also possible, although administration of suitable doses becomes more difficult.

Tablets, containing, for instance, between about 25 mg. and about 100 mg. and preferably 50 mg. of the mixture of active ingredients per tablet, have proved to be especially suitable.

Substituted 1-oxa-4-aza-cycloalkanes may be obtained in good yields and by simple methods by heating appropriately substituted N-benzyl-oxy-alkylamine compounds such as, for example, N-benzyl-1-phenyl-1-oxy-propyl-amine-(2) in benzolic solution, in the presence of monochlorinated aliphatic acids such as chloracetic acid, and potassium carbonate with the reaction water being removed azeotropically. After filtration of the sodium chloride formed and evaporation of the solvent one obtains the corresponding acid lactones such as, for example, the N - benzyl-alpha-(1 - phenyl-1-oxy-propylamine - (2))-acetic acid lactone. The acid lactones are reduced with lithium aluminium hydride preferably in ether and at low temperatures to the corresponding acetal-dehyde-semi-acetals such as the N-benzyl-alpha-(1-phenyl-1-oxy-propylamine-(2))-acetaldehyde-semi-acetal.

The acetaldehyde-semi-acetals are relatively sensitive substances. There is equilibrium between the semiacetalic form and the open aldehyde. By careful chlorination of the semi-acetal preferably with thionyl chloride in ether and at low temperatures one now obtains stable 6-chloro-1-oxa-4-aza-cyclo-alkane compounds such as, for example, the N - benzyl - 2 - phenyl-3-methyl-6-chloro-1-oxa-4-aza-cyclohexane.

From this there are obtained the process products by either hydrogenating the chlorine compounds in the presence of precious metal catalysts such as palladium carbon, and at normal pressure or at slight excess pressure with the halogen and benzyl radicals being separated, or by effecting the separation of halogen with lithium-aluminium-hydride and subsequently separating the benzyl radical with precious metal catalysts.

minium hydride, stirs after the addition for two hours at from —10° to —15° and allows the temperature to slowly raise to 20°. The reaction solution is intermixed with water, the precipitate is sucked off and the solvent is removed after drying over sodium sulphate.

EXAMPLE C.—N-BENZYL-2-PHENYL-3-METHYL-6-CHLORO-MORPHOLINE-HYDROCHLORIDE 14.1 g. of N - benzyl-1-alpha - (1-phenyl-1-oxy-propyl-amine-(2))-acetal dehyde-semi-acetal are dissolved in 75 ml. of absolute ether and are added drop by drop to thionylchloride by stirring at a temperature between 0 and 10°. After the addition is effected it is stirred for two hours at room temperature and subsequently heated up to boiling temperature for one hour. The brownish

*Reaction scheme*

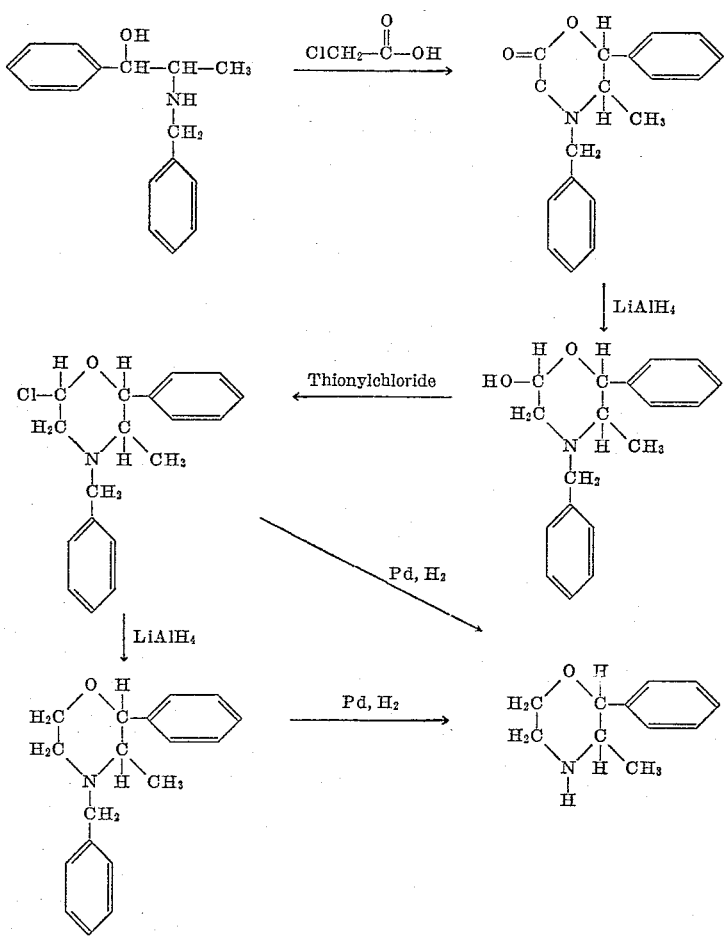

EXAMPLE A.—N-BENZYL-ALPHA-(1-PHENYL-1-OXY-PROPYLAMINE-(2))-ACIDIC ACID LACTONE 24.1 g. of N-benzyl-1-phenyl-1-oxy-propylamine and 9.4 g. of chloracetic acid are added to 50 ml. of absolute benzene and are vigorously stirred. As soon as dissolution is attained, one adds 6.9 g. of potassium carbonate and heats to boiling temperature. The reaction water is distilled off azeotropically. As soon as the water ceases to distill off, one allows cooling and effects separation from the precipitated sodium chloride. After removal of the solvent the reaction product is distilled in a high vacuum. The yield is 87% of the theory.

EXAMPLE B.—N-BENZYL - ALPHA -(1 - PHENYL-1-OXY-PROPYLAMINE-(2))-ACETAL DEHYDE-SEMI-ACETAL 14 g. of benzyl-alpha - (1 - phenyl-1-oxy-propylamine-(2))-acetic acid lactone are dissolved in 50 ml. of absolute ether with the solution being cooled to —15°. By vigorously stirring one introduces 0.5 g. of lithium alufinely crystallized precipitate is sucked off and repeatedly washed with ether.

EXAMPLE D.—N-BENZYL-2-PHENYL-3-METHYL-1-OXA-4-AZA-CYCLOHEXANE 33.8 g. of N-benzyl-2-phenyl-3-methyl-6-chloro-1-oxa-4-aza-cyclohexane-HCl are washed in 20 ml. of absolute ether with 2 g. of lithium aluminium hydride being added at a time. One heats for 3 hours up to boiling, effects disintegration with water and separates the precipitate. The ether solution is dried over sodium sulphate, the solvent is removed and the residue distilled at a boiling point of from 154° to 156° C./0.6 mm.

EXAMPLE E.—2-PHENYL-3-METHYL-1-OXA-4-AZA-CYCLOHEXANE 26 g. of N-benzyl-2-phenyl-3-methyl-1-oxa-4-aza-cyclohexane are dissolved in 260 ml. of methanol and hydrogenated in the presence of palladium carbon in a concentration of 4% and at room temperature and 1–2 atm.

gauge. After termination of the hydrogen absorption the catalyst is separated with the residue being distilled at the oil pump. The boiling point of the base is 104° C./1.0 mm.

EXAMPLE F.—2-PHENYL-2-METHYL-1-OXA-4-AZA-CYCLOHEXANE 34 g. of N-benzyl-2-phenyl-3-methyl-6-chloro-1-oxa-4-aza-cyclohexane-HCl are dissolved in 200 ml. of methanol and hydrogenated in the presence of palladium carbon in a concentration of 4% and at room temperature and 2 atm. gauge. After termination of the hydrogen absorption the catalyst is separated, the solvent evaporated in a vacuum and the remainder crystallized from acetone and ether. The melting point of the recrystallized hydrochloride is 181° C.

The 1-oxa-4-aza cycloalkane compounds, of Formula IV can also be prepared, for instance, by subjecting dialkanol-amino compounds of Formula V to a ring closure reaction:

$$\begin{array}{c} \text{HO--CH--R}_3 \\ | \\ \text{CH--R}_4 \\ | \\ \text{HO(CH}_2)_n\text{--N--R}_5 \end{array} \quad (V)$$

In said formula $R_3$, $R_4$, $R_5$, and $n$ represent the same substituents and integers as in Formula IV. Such ring closure reaction is effected by adding the corresponding alkanolamino ethanol base or its acid addition salts, with or without external cooling, to concentrated sulfuric acid. It is of advantage to operate at elevated temperature, for instance, at 90° C. in order to effect complete ring closure.

The starting materials, the alkanolamino ethanol compounds of Formula V are obtained, for instance, by converting correspondingly substituted alkinols, such as 1-phenylpropyne-2-ol-(1) into ketals, reducing such ketals in the presence of primary amines or of amino ethanol and, if such reducing treatment has been carried out with primary amines, subsequently introducing the ethanol group into the reduction product. This method may be illustrated by the following equations:

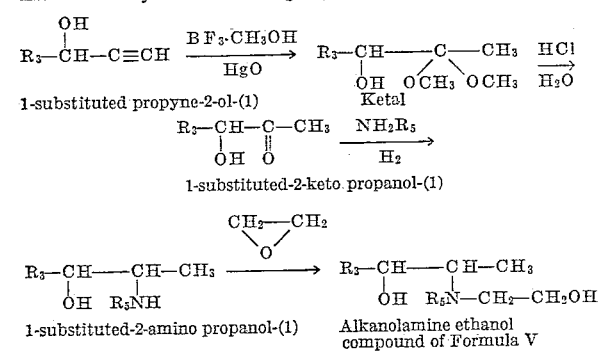

Another method of producing 1-oxa-4-aza cycloalkane compounds of Formula IV whereby ring closure of alkanolamine ethanol compounds of Formula V by means of acid agents, preferably of concentrated sulfuric acid is avoided, comprises reducing, preferably catalytically by means of metals of the 8th group of the periodic system hydroxy or C-acyl ketones of Formula VI in the presence of amino alcohols of Formula VII and preferably of acid addition salts of such amino alcohols, in suitable solvents such as alcoholic or aqueous-alcoholic solvents at elevated pressure and temperature. The resulting hydrogenation products of Formula VIII and especially their acid addition salts are then gently halogenated in an inert organic solvent such as benzene. Halogenation is effected, for instance, by means of thionylchloride at room temperature whereby, if desired, the resulting acids are neutralized with suitable neutralizing agents, for instance, with pyridine or potassium carbonate. The halogeno compounds of Formula IX obtained thereby are added in the form of the base or their acid addition salts, while stirring vigorously, into heated, aqueous-alkaline or alcoholic-alkaline solutions and stirring of the reaction mixture is continued for 1 to 2 hours to complete the condensation. The bases of Formula IV are directly obtained thereby. They can be purified by fractional distillation or by means of their acid addition salts, for instance, their hydrochlorides. The reaction may be illustrated by the following equations:

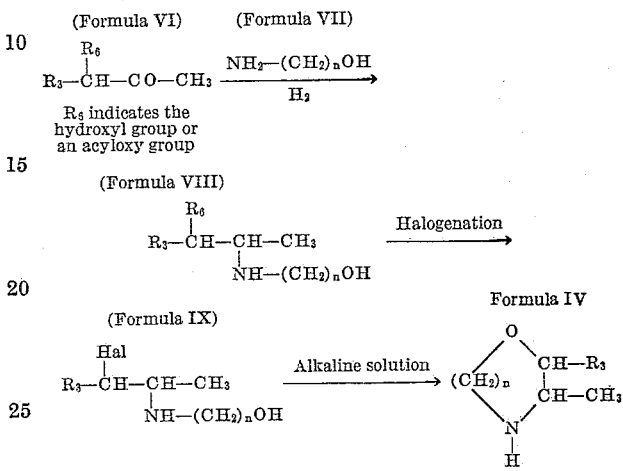

This method of producing 1-oxa-4-aza cycloalkane compounds of Formula IV whereby ring closure is effected in alkaline medium has the advantage over the first mentioned method whereby ring closure is effected by means of concentrated sulfuric acid that it is possible to directly produce in the last reaction step the desired bases without having to neutralize all the sulfuric acid required for the ring closure reaction.

The following examples serve to illustrate the two above described methods of producing the desired 1-oxa-4-aza cycloalkane compounds of Formula IV without, however, limiting the reactions to the starting materials and conditions given in said examples.

EXAMPLE 4

500 g. of 1-phenyl propyne-2-ol-(1) dissolved in 500 cc. of methanol are slowly added, while stirring, to a solution of 100 cc. of boron trifluoride-methanol $(BF_3 \cdot CH_3OH)$ containing 50% by weight of boron trifluoride and 5 g. of mercuric oxide (HgO) in 1250 cc. of methanol. Stirring of the reaction mixture is continued for 2 hours. 1-phenyl-2,2-dimethoxy propanol-(1) is obtained in a yield of about 90%. Said compound is split up by heating to boiling with a dilute aqueous methanolic hydrochloric acid solution, neutralized, filtered, and extracted with 500 cc. of ether. After evaporating the ether, 504 g. of 1-phenyl-2-keto propanol-(1) are obtained. The yield is about 87% of the theoretical yield. Said 1-phenyl-2-keto propanol-(1) is dissolved in 1000 cc. of methanol and is catalytically hydrogenated at 80° C. and under a pressure of 100 athmospheres gauge with hydrogen in the presence of 100 g. of methyl-amine and Raney-nickel catalyst. Thereafter the catalyst is removed by centrifuging. 165 g. of ethylene oxide are passed into the methanolic solution of the resulting 1-phenyl-2-methyl-amino propanol-(1). The reaction mixture subsequently heated to boiling for one hour. The methanol is removed by distillation.

Ether is preferably added to cause crystallization of 1-phenyl-2-(methyl β-hydroxy ethyl) amino propanol-(1). 453 g. of said compound are added to 453 cc. of concentrated sulfuric acid. The mixture is heated to a temperature of 100° C. for about 7 hours while stirring.

The resulting sulfuric acid solution is rendered alkaline by the addition of 35% sodium hydroxide solution until the pH of the alkalized solution is 12.0. Cooling during said alkalization is necessary. The alkaline reaction product is thoroughly extracted by means of ether; the ethereal solution is dried over sodium hydroxide, filtered and concentrated by evaporation. The 2-phenyl-3,4-dimethyl tetrahydro-1,4-oxazine base obtained thereby distills at 118° C./2.0 mm. It is obtained in the form of a colorless slightly viscous oil. Ring closure by means of concentrated sulfuric acid proceeds with a yield of about 90% of the theoretical yield.

EXAMPLE 5

500 g. of 1-phenyl propyne-2-ol-(1), dissolved in 500 cc. of methanol, are slowly added to a solution of 100 cc. of boron trifluoride-methanol ($BF_3 \cdot CH_3OH$), containing about 50% by weight of boron trifluoride, and 5 g. of mercuric oxide (HgO) in 1250 cc. of methanol. The resulting 1-phenyl-2,2-dimethoxy propanol-(1) is split up, while heating to boiling, by means of an aqueous-methanolic hydrochloric acid solution and is subsequently neutralized by the addition of solid sodium carbonate. The filtered reaction solution is catalytically hydrogenated by means of hydrogen at a temperature of 90° C. and a pressure of 100 atmospheres gauge in the presence of 240 g. of amino ethanol and Raney-nickel catalyst. After hydrogenation is completed, the catalyst is separated by centrifuging and the solvent is removed from the resulting solution by evaporation.

468 g. of 1-phenyl-2-(hydroxy ethyl) amino propanol-(1) are obtained in crystalline form by the addition of ether. Said compound is heated with 468 g. of concentrated sulfuric acid to a temperature of 95° C.

The sulfuric acid reaction solution is rendered alkaline, while cooling, by the addition of dilute sodium hydroxide solution until its pH is 12.0. Subsequently the alkaline solution is extracted by means of ether. After evaporating the solvent, 2-phenyl-3-methyl tetrahydro-1,4-oxazine base is obtained by distillation at a boiling point of 108° C./2.0 mm. in the form of a colorless slightly viscous oil. The yield is 412 g.

EXAMPLE 6

A solution of 88.5 g. of 2-phenyl-3-methyl tetrahydro-1,4-oxazine base in 45 cc. of toluene, obtained according to Example 5, are added drop by drop, while stirring vigorously, to a suspension of 20 g. of sodium amide in 250 cc. of absolute toluene. The reaction mixture is heated for four hours to boiling, allowed to cool, and 55 g. of ethyl bromide dissolved in 110 cc. of absolute toluene are added thereto, while stirring is continued. The reaction mixture is heated in an autoclave to a temperature of 150° C. for 5 hours, while shaking.

After cooling, the precipitated salt is filtered off and the solvent is removed by evaporation at 20 mm. pressure. The residue is subjected to fractional distillation. 102 g. of 2-phenyl-3-methyl-4-ethyl tetrahydro-1,4-oxazine are obtained at a boiling point of 132° C./4.0 mm. in an excellent yield.

EXAMPLE 7

When using in place of 240 g. amino ethanol, 300 g. of 3-amino propanol and otherwise proceeding in the same manner as described in Example 5, 1-phenyl-2-hydroxy propylamino propanol-(1) is obtained. This compound is subjected to ring closure reaction by means of concentrated sulfuric acid and yields thereby 2-phenyl-3-methyl-1-oxa-4-aza cycloheptane in a good yield.

EXAMPLE 8

When using in place of amino ethanol, 356 g. of 4-amino-n-butanol and otherwise proceeding as described in Example 5, 1-phenyl 2-hydroxy-n-butyl-amino propanol-(1) is obtained. Ring closure of said compound is effected with concentrated sulfuric acid, whereby 2-phenyl-3-methyl-1-oxa-4-aza cyclooctane is obtained.

EXAMPLE 9

192 g. of 1-phenyl-1-acetyl propane-2-one are dissolved in 200 cc. of methanol. 110 g. of 1-amino propanol-(3) hydrochloride are added thereto and the mixture is hydrogenated at 75° C. and a hydrogen pressure of 95 atmospheres gauge in the presence of 5 cc. of Raney-nickel catalyst. After hydrogen absorption has ceased, the catalyst is separated by filtration and the hydrogenation solution is concentrated by evaporation. The residue is suspended in 300 cc. of absolute benzene. 74 cc. of thionylchloride are added to said suspension at room temperature, while stirring vigorously and cooling externally. Thereafter, the reaction mixture is heated for one hour to 70° C., allowed to cool, the benzene phase is decanted, and is extracted with 150 cc. of water. The residue remaining after decanting is dissolved in said aqueous extract and the resulting aqueous solution is allowed to run, while stirring, into a 50% solution of sodium hydroxide containing 150 g. of solid sodium hydroxide which solution is heated to 80° C. Stirring is continued for 2 hours while heating to boiling. The reaction mixture is allowed to cool, and the resulting 2-phenyl-3-methyl-1-oxa-4-aza cycloheptane base is separated. The base is distilled in a vacuum at a temperature of 109–111° C./0.1 mm. The hydrochloride obtained therefrom has a melting point of 154° C. the yield is 73% of the theoretical yield.

EXAMPLE 10

288 g. of 1-phenyl-1-acetyl propane-2-one are dissolved in 250 cc. of methanol. The solution is aminated under reducing conditions with 138 g. of 1-amino ethanol-(2) hydrochloride as described above in Example 9. The residue is suspended in 250 cc. of absolute benzene. 115 cc. of thionylchloride are added to said suspension at room temperature, while stirring vigorously. Thereafter, the reaction solution is heated to boiling and stirring is continued for one hour. After cooling, the benzene phase is decanted and is extracted with 200 cc. of water. The aqueous extract is added to the residue obtained on decanting and the resulting aqueous solution is allowed to run into a 30% potassium hydroxide solution containing 250 g. of solid potassium hydroxide and heated to 90° C., while stirring vigorously. Heating to boiling and stirring is continued for 2 hours. After cooling the resulting 2-phenyl-3-methyl-1-oxa-4-aza cyclohexane base is separated and is distilled in a vacuum. A colorless, slightly viscous oil, boiling at 96° C./0.5 mm. is obtained thereby. Its hydrochloride melts at 183° C. Yield: 82% of the theoretical yield.

EXAMPLE 11

74 cc. of thionylchloride are added drop by drop to a solution of 209 g. of 1-phenyl-2-propanol amino propanol-(1) in 500 cc. of absolute benzene at room temperature, while stirring vigorously. After heating for one hour, the mixture is cooled, the benzene solution is decanted from the precipitated hydrochloride, and is extracted by means of 100 cc. of water. The precipitated hydrochloride is dissolved in said aqueous extract and the resulting solution is added to a 50% sodium hydroxide solution, containing 200 g. of solid sodium hydroxide and heated to 80° C., while stirring vigorously. Thereafter, the reaction mixture is heated to boiling and stirring is continued for 2 hours. The precipitating 2-phenyl-3-methyl-1-oxa-4-aza cycloheptane base is separated. It is purified by vacuum distillation and distills at 108–110° C./0.5 mm. The hydrochloride obtained therefrom has a melting point of 154° C., the yield is 78% of the theoretical yield.

As stated hereinabove, it has proved to be of advantage to separate the 1-oxa-4-aza cycloalkane compounds of Formula IV which are obtained in the form of their racemic mixtures by the above described synthetic process, into their optically active components. Such optically active compounds can directly be obtained by subjecting the corresponding optically active dialkanol amino compounds of Formula V given hereinabove to ring closure reaction by means of agents capable of splitting off water such as concentrated sulfuric acid. It is noteworthy and quite surprising that the resulting ring closure products rotate the plane of polarized light in the direction opposed to the optical rotation of the starting dialkanol amino compounds. Thus, l-1-phenyl-2-amino ethanol propanol-(1) with a rotatory power $[\alpha]_D^{18} = -7.8°$ (in methanol) yields, on ring closure, dextrorotatory 2-phenyl-3-methyl tetrahydro-1,4-oxazine with a rotatory power $[\alpha]_D^{18} = +26.5°$ (in methanol). Likewise, d-1-phenyl-2-methyl-amino ethanol propanol-(1) with a rotatory power $[\alpha]_D^{18} = +11.5°$ (in methanol) yields, on ring closure, levorotatory 2-phenyl-3,4-dimethyl tetrahydro-1,4-oxazine with a rotatory power $[\alpha]_D^{18} = -30.8°$ (in methanol).

The respective optically active dialkanol amino compounds used as starting materials in the synthesis of optically active 1-oxa-4-aza cycloalkane compounds of Formula IV can be obtained, for instance, from the optically active and especially the levorotatory phenyl acetyl carbinol which is prepared by a fermentation process (see Biochemische Zeitschrift, vol. 115, page 282 (1921); vol. 127, page 325 (1922)).

Furthermore, the process according to the present invention permits the use of optically active compounds which are obtained, for instance, on separating the optically active components obtained in the ephedrine synthesis. d-Ephedrine, for instance, is obtained thereby as a comparatively valueless byproduct. Such a valueless optically active compound can readily be converted into the corresponding optically active d-1-phenyl-2-(methyl hydroxy ethyl) amino propanol-(1) which, on ring closure, yields l-2-phenyl-3,4-dimethyl tetrahydro-1,4-oxazine.

The following samples serve to illustrate the new process of producing optically active 1-oxa-4-aza cycloalkane compounds of Formula IV by starting with optically active dialkanol amino compounds of Formula V which rotate the plane of polarized light in opposite direction, without, however, limiting the procedure to said examples.

EXAMPLE 12

54 g. of dextrorotatory 1-phenyl-2-(methyl β-hydroxy ethyl) amino propanol-(1) having the rotatory power $[\alpha]_D^{18} = +12°$ (in methanol) are added, while stirring, to 54 cc. of sulfuric acid (specific density: 1.840). The mixture is heated to 90° C. for 5 hours. The reaction product is poured on ice, rendered alkaline by the addition of 30% sodium hydroxide solution and extracted with ether. The ethereal solution is washed with a small amount of saturated sodium chloride solution, dried over sodium sulfate, concentrated by evaporation, and the residue is subjected to fractional vacuum distillation. 1-2-phenyl-3,4-dimethyl tetrahydro-1,4-oxazine distills over at 91–92° C./0.5 mm. in the form of a colorless slightly viscous oil. 43 g. are obtained. Rotatory power $[\alpha]_D^{18} = -30.8°$ (in methanol).

The hydrochloride of said base has a rotatory power $[\alpha]_D^{18} = -36.2°$ (in methanol).

EXAMPLE 13

125 g. of levorotatory 1-phenyl-2-(methyl β-hydroxy ethyl) amino propanol-(1) having the rotatory power $[\alpha]_D^{18} = -11.5°$ (in methanol) are added, while stirring, to 125 cc. of sulfuric acid (specific density: 1.840). The mixture is stirred at 90° C. for 6 hours. The residue obtained in the same manner as described in the preceding Example 12, distills at 82–84° C./0.5 mm. in the form of a colorless slightly viscous oil. 110.5 g. are obtained thereby. Rotatory power $[\alpha]_D^{18} = +38.4°$ (in methanol). The hydrochloride prepared from said base has the same rotatory power.

EXAMPLE 14

35 g. of levorotatory 1-phenyl-2-(β-hydroxy ethyl) amino propanol-(1) of the rotatory power $[\alpha]_D^{18} = -7.8°$ are added to 35 cc. of sulfuric acid (specific density: 1.840). The mixture is heated to 80° C. for 2 hours. The residue is isolated in the same manner as described in the preceding Examples 12 and 13. It distills at 80–82° C./0.5 mm. in the form of a slightly viscous colorless oil. 30.2 g. are obtained. Rotatory power of the base $[\alpha]_D^{18} = +22.2°$ (in methanol). The rotatory power of the hydrochloride of said d-2-phenyl-3-methyl tetrahydro-1.4-oxazine $[\alpha]_D^{18}$ corresponds to $+26.5°$ (in methanol).

It is, of course, also possible to produce optically active 1-oxa-4-aza cycloalkane compounds of Formula IV by resolving the racemic mixture of said compounds into their optically active components according to methods as they are known to the art. The preparation of such optically active compounds of Formula IV by starting with optically active starting material and subjecting such starting materials to ring closure reaction, however, has the advantage of great simplicity so that it can be carried out on a technical scale without any difficulties.

As stated hereinabove, the new 1-oxa-4-aza cycloalkane bases of Formula IV are preferably administered in therapy in the form of their acid addition salts. According to an especially valuable embodiment of the present invention there are produced new acid addition salts of such 1-oxa-4-aza cycloalkane bases of Formula IV which salts not only possess a surprisingly high water solubility but also substantially enhanced and improved therapeutic properties. Such new and valuable salts are the salts of theophylline and of 8-halogeno theophylline and especially of 8-chloro theophylline with water insoluble 1-oxa-4-aza cycloalkane compounds of the following Formula X

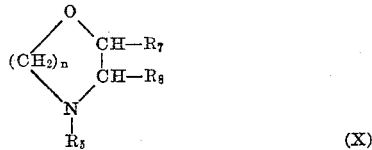

(X)

wherein $R_7$ represents an aryl radical which may be substituted, for instance, by hydroxyl groups or by chlorine, and especially the phenyl radical;

$R_8$ represents an alkyl radical, and especially a lower alkyl radical;

$R_5$ represents hydrogen, an alkyl radical, or a hydroxy alkyl radical, and especially a lower alkyl radical or a hydroxy (lower) alkyl radical, and $n$ indicates an integer from 2 to 4.

Especially suitable 1-oxa-4-aza cycloalkane compounds are the compounds which correspond to the above given Formula IV.

The new compounds are obtained, for instance, by heating the 1-oxa-4-aza cycloalkane compounds of Formula X, preferably in a molar ratio, with theophylline or 8-halogeno theophylline either in a suitable organic solvent, for instance, in ethanol, or in water and concentrating by evaporation the resulting solution to the desired concentration preferably until crystallization of the salt sets in.

Another process of preparing such salts consists in triturating the above mentioned components alone or in the presence of a solvent, for instance, of acetone.

When proceeding in the above described manner, there are obtained solutions of the new addition compounds having a pH-value of 9.0 or less depending on the ratio of 1-oxa-4-aza cycloalkane compound to theophylline or 8-halogeno theophylline.

To use an 8-halogeno theophylline, preferably 8-chloro theophylline has the advantage that solutions can be prepared the pH-value of which is below about 7.5 when reacting such an 8-halogeno theophylline with an 1-oxa-4-aza cycloalkane base in molar proportions. Well defined compounds can be isolated from such solutions. Such compounds are especially suitable for therapeutic purposes because their aqueous solutions have a practically neutral pH-value.

When reacting the theophylline compounds and especially the 8-halogeno theophylline compounds with 1-oxa-4-aza cycloalkane bases of Formula X at higher temperatures, for instance, at 180° C. by heating said components as such or in a suitable high boiling solvent to said temperature, addition compounds are formed the melting points of which are in general above 200° C. The theory is advanced without, however, limiting the reaction to such a theory, that at such higher reaction temperature a different reaction mechanism, probably quaternization, takes place. For instance, the 8-chloro theophylline salt of 2-phenyl-3-methyl tetrahydro-1,4-oxazine which is obtained by simply triturating the two components, if desired, in the presence of a small amount of a solvent melts at 128° C. On further increasing the temperature it solidifies and melts again at 234° C. When heating the mixture of the components to 180° C., the melting point of the resulting compound is at 234° C.

The new salts according to the present invention can also be prepared by treating acid addition salts of 1-oxa-4-aza cycloalkane compounds of Formula X such as, for instance, their sulfates, with alkaline earth metal hydroxides in the presence of theophylline or 8-halogeno theophylline in a solvent, for instance, in water or methanol, filtering off the precipitated alkaline earth metal salt, and proceeding as described hereinabove.

When using optically active 1-oxa-4-aza cycloalkane compounds of formula X as the one reaction component in the process according to the present invention, optically active compounds are obtained which exhibit the enhanced therapeutic activity of the optically active 1-oxa-4-aza cycloalkane compounds in an especially pronounced manner. The preparation of such optically active compounds and the use of optically active 1-oxa-4-aza cycloalkane compounds as the one reaction component for the reaction with theophylline or, respectively, 8-halogeno theophylline, thus represents an especially valuable embodiment of the present invention.

The following examples serve to illustrate a process of preparing such new salts according to the present invention without, however, limiting the same thereto.

EXAMPLE 15

88.5 g. of 2-phenyl-3-methyl-1,4-morpholine and 107.5 g. of 8-chloro theophylline are triturated as such. The 8-chloro theophylline salt of 2-phenyl-3-methyl-1,4-morpholine crystallizes in a short period of time. Its melting point is 128° C. The yield is quantitative. Its 10% aqueous solution has a pH-value of 7.1.

EXAMPLE 16

In the same manner like Example 15 there are produced chlorotheophyllinates of the dextrorotatory 2-phenyl-3-methyl-1,4-morpholine. The rotatory power of the chlorotheophylline salt: $[\alpha]_D^{18} = +9.9$.

EXAMPLE 17

10.6 g. of 2-(2'-chloro phenyl)-3-methyl-1,4-morpholine are heated to boiling in 50 cc. of methanol with 10.8 g. of 8-chloro theophylline, while stirring. The solution is then evaporated to dryness in a vacuum, whereby the 8-chloro theophylline salt of 2-(2'-chloro phenyl)-3-methyl-1,4-morpholine is obtained as a solid compound.

EXAMPLE 18

6 g. of 2-(4'-hydroxy phenyl)-3-methyl-1,4-morpholine sulfate and 4.5 g. of theophylline are dissolved in 30 cc. of methanol. A concentrated barium hydroxide solution containing 1.2 g. of barium ion is added to said solution and the mixture is heated to boiling while stirring. The precipitated barium sulfate is filtered off. Thereby, a solution of 2-(4'-hydroxy phenyl)-3-methyl-4-theophylline-1,4-morpholine is obtained. The solvent is distilled off and the residue is dissolved in water to yield a solution of the desired concentration.

EXAMPLE 19

110.3 g. of 2-phenyl-3-methyl-4-ethanol-1,4-morpholine are dissolved in 25 cc. of acetone. 107.5 g. of 8-chloro theophylline are added thereto and the mixture is intimately triturated. Within a comparatively short period of time the 2-phenyl-3-methyl-4-ethanol-4-(8-chloro theophylline) tetrahydro-1,4-oxazine is obtained in a quantitative yield in solid form.

The 2-(2'-chloro phenyl)-3-methyl-1,4-morpholine used in Example 17 as starting material and the 2-(4'-hydroxy phenyl)-3-methyl-1,4-morpholine sulfate used in Example 18 as starting material are prepared by effecting ring closure of 1-(2'-chloro phenyl)-2-(β-hydroxy ethyl) amino propanol-(1) or, respectively, 1-(4'-hydroxy phenyl)-2-(β-hydroxy ethyl) amino propanol-(1) by means of concentrated sulfuric acid in a similar manner as described in Examples 4 and 5.

Of course, many changes and variations in the starting materials, the solvents and catalysts used, the reaction conditions, temperature, and duration, the methods of working up the reaction mixtures and of isolating and purifying the resulting 1-oxa-4-aza cycloalkane compounds, and of converting such compounds into their salts with theophylline or 8-halogeno theophylline, the preparation of therapeutically highly effective and well tolerated compositions, and the like may be made by those skilled in the art in accordance with the principles set forth herein and in the claims annexed hereto. In the following there is given an example for the production of an alcoholic component of the oxyalkylmorpholine esters of the phenyl acetic acids.

177 g. of 2-phenyl-3-methyl-1-oxa-4-aza-cyclohexane base are dissolved in 50 ml. of methanol and 50 g. of ethylene oxide are introduced while stirring at boiling temperature. Subsequently the reaction solution is kept boiling for an hour, the methanol is distilled off, the residue still hot is intermingled with ether. After cooling the 2-phenyl-3-methyl-N-oxyethyl-1-oxa-4-aza-cyclohexane base, with the melting point being from 65° to 67°, crystallizes to give a yield of 80%.

The 1-phenyl-1-acetylpropane-2-on used in Example 9 was produced as follows:

150 g. of 1-phenyl-propanol-1-on-2 are dissolved in 50 ml. of glacial acetic acid, intermingled with some drops of sulphuric acid and added drop by drop and by stirring to 110 g. of acetic acid anhydride. Subsequently, one stirs for five hours at boiling temperature. To the cooled reaction solution one adds 200 ml. of ether, washes with ice water and evaporates the separated and neutrally washed ether solution after drying over sodium sulphate. As the residue there remain 186 g. of 1-phenyl-1-acetyl-propane-2-on.

We claim:

1. A central stimulant and appetite depressant composition comprising, as active ingredients, the α-phenyl-α-ethyl acetic acid ester of 2-phenyl-3-methyl-4-(β-hydroxy ethyl) tetrahydro-1,4-oxazine and the addition compound of 8-chloro theophylline and 2-phenyl-3-methyl tetrahydro-1,4-oxazine, said active ingredients being present in said composition in the proportion of about 2:3 of ester to addition compound.

2. A central stimulant and appetite depressant composition comprising, as active ingredients, the α-phenyl-α-ethyl acetic acid ester of 2-phenyl-3-methyl-4-(β-hydroxy ethyl) tetrahydro-1,4-oxazine and a salt selected from the group consisting of the addition compounds of theophylline and of 8-chloro theophylline and a 1-oxa-4-aza cycloalkane compound of the formula

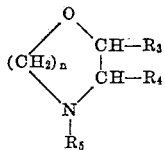

wherein
R₃ represents a member selected from the group consisting of the phenyl radical, the phenyl radical substituted by a hydroxyl group, and the phenyl radical substituted by chlorine;
R₄ represents a lower alkyl radical;
R₅ represents a member selected from the group consisting of hydrogen, a lower alkyl radical, and a hydroxy (lower) alkyl radical; and
n is an integer from 2 to 4;

said active ingredients being present in said composition in a proportion between about 3:7 and about 7:3 of ester to addition compound.

3. A central stimulant and appetite depressant composition comprising, as active ingredients, the α-phenyl-α-ethyl acetic acid ester of 2-phenyl-3-methyl-4-(β-hydroxy ethyl) tetrahydro-1,4-oxazine and an addition compound selected from the group consisting of the theophylline addition compound and the 8-chloro theophylline addition compound of a dextrorotatory 1-oxa-4-axa cycloalkane compound of the formula

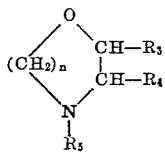

wherein

R₃ represents a member selected from the group consisting of the phenyl radical, the phenyl radical substituted by a hydroxyl group, and the phenyl radical substituted by chlorine;
R₄ represents a lower alkyl radical;
R₅ represents a member selected from the group consisting of hydrogen, a lower alkyl radical, and a hydroxy (lower) alkyl radical; and
n is an integer from 2–4;

said active ingredients being present in said composition in a proportion between about 3:7 and about 7:3 of ester to addition compound.

4. A central stimulant and appetite depressant composition comprising, as active ingredients, the α-phenyl-α-ethyl acetic acid ester of 2-phenyl-3-methyl-4-(β-hydroxy ethyl) tetrahydro-1,4-oxazine and the addition compound of 8-chloro theophylline and 2-phenyl-3-methyl-4-methyl tetrahydro-1,4-oxazine, said active ingredients being present in said composition in a proportion between about 3:7 and about 7:3 of ester to addition compound.

5. A central stimulant and appetite depressant composition comprising, as active ingredients, the α-phenyl-α-ethyl acetic acid ester of 2-phenyl-3-methyl-4-(β-hydroxy ethyl) tetrahydro-1,4-oxazine and the addition compound of 8-chloro theophylline and 2-phenyl-2-methyl-4-(β-hydroxy ethyl) tetrahydro-1,4-oxazine, said active ingredients being present in said composition in a proportion between about 3:7 and about 7:3 of ester to addition compound.

6. A central stimulant and appetite depressant composition comprising, as active ingredients, the α-phenyl-α-ethyl acetic acid ester of 2-phenyl-3-methyl-4-(β-hydroxy ethyl) tetrahydro-1,4-oxazine and the addition compound of 8-chloro theoplylline and 2-phenyl-3-methyl-1-oxa-4-aza cycloheptane, said active ingredients being present in said composition in a proportion between about 3:7 and about 7:3 of ester to addition compound.

7. A central stimulant and appetite depressant composition comprising, as active ingredients, the α-phenyl-α-ethyl acetic acid ester of 2-phenyl-3-methyl-4-(β-hydroxy ethyl) tetrahydro-1,4-oxazine and the addition compound of 8-chloro theophylline and d-2-phenyl-3-methyl tetrahydro-1,4-oxazine, said active ingredients being present in said composition in a proportion between about 3:7 and about 7:3 of ester to addition compound.

8. A central stimulant and appetite depressant composition in dosage unit form, said composition comprising, per dosage unit, between about 50 mg. and about 200 mg. of a mixture of active ingredients and a pharmaceutical carrier, said mixture consisting of the α-phenyl-α-ethyl acetic acid ester of 2-phenyl-3-methyl-4-(β-hydroxy ethyl) tetrahydro-1,4-oxazine and an addition compound selected from the group consisting of the addition compounds of theoplylline and of 8-chloro theophylline and a 1-oxa-4-aza cycloalkane compound of the formula

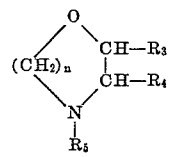

wherein
R₃ represents a member selected from the group consisting of the phenyl radical, the phenyl radical substituted by a hydroxyl group, and the phenyl radical substituted by chlorine;
R₄ represents a lower alkyl radical;
R₅ represents a member selected from the group consisting of hydrogen, a lower alkyl radical, and a hydroxy (lower) alkyl radical; and
n is an integer from 2 to 4, said active ingredients being present in said mixture in a proportion between about 3:7 and about 7:3 of ester to addition compound.

9. A central stimulant and appetite depressant composition in tablet dosage unit form, said composition comprising, per tablet dosage unit, between about 50 mg. and about 200 mg. of a mixture of active ingredients and a solid pharmaceutical carrier, said mixture consisting of the α-phenyl-α-ethyl acetic acid ester of 2-phenyl-3-methyl-4-(β-hydroxy ethyl) tetrahydro-1,4-oxazine and the addition compound of 8-chloro theophylline and 2-phenyl-3-methyl tetrahydro-1,4-oxazine, said active ingredients being present in said mixture in a proportion between about 3:7 and about 7:3 of ester to addition compound.

10. The addition compound of 8-chloro theophylline and 2-phenyl-3-methyl tetrahydro-1,4-oxazine.

11. The addition compound selected from the group consisting of the theophylline addition compound and the 8-chloro theophylline addition compound of an 1-oxa-4-aza cycloalkane compound of the formula

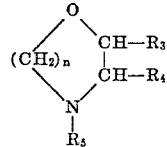

wherein
R₃ represents a member selected from the group consisting of the phenyl radical, the phenyl radical substituted by a hydroxyl group, and the phenyl radical substituted by chlorine;
R₄ represents a lower alkyl radical;
R₅ represents a member selected from the group consisting of hydrogen, a lower alkyl radical, and a hydroxy (lower) alkyl radical; and
n is an integer from 2–4.

(References on following page)

References Cited in the file of this patent

UNITED STATES PATENTS

| | | |
|---|---|---|
| 2,447,395 | Cheney et al. | Aug. 17, 1948 |
| 2,538,794 | Moffet et al. | Jan. 23, 1951 |
| 2,538,795 | Moffet et al. | Jan. 23, 1951 |
| 2,711,410 | Holbert et al. | June 21, 1955 |
| 2,714,083 | Ferguson | July 26, 1955 |
| 2,739,921 | Bennett | Mar. 27, 1956 |

OTHER REFERENCES

Greenbaum: "New Water Soluble Theophylline Compound," American Journal of Pharmacy, November 1937, page 550, 1st sentence of the 4th paragraph.

U.S. Reg. Trademark 617,739, to Boehringer, registered Dec. 20, 1955.